(12) United States Patent
Miura et al.

(10) Patent No.: US 10,459,329 B2
(45) Date of Patent: Oct. 29, 2019

(54) PROJECTION-TYPE DISPLAY APPARATUS

(71) Applicant: CANON KABUSHIKI KAISHA, Tokyo (JP)

(72) Inventors: Shun Miura, Utsunomiya (JP); Yuuki Maeda, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 27 days.

(21) Appl. No.: 15/945,015

(22) Filed: Apr. 4, 2018

(65) Prior Publication Data

US 2018/0292742 A1  Oct. 11, 2018

(30) Foreign Application Priority Data

Apr. 11, 2017  (JP) .................................. 2017-078473

(51) Int. Cl.
| | |
|---|---|
| *G03B 21/20* | (2006.01) |
| *G03B 21/26* | (2006.01) |
| *G03B 33/12* | (2006.01) |
| *G02B 27/28* | (2006.01) |
| *G02B 5/30* | (2006.01) |
| *G02B 27/12* | (2006.01) |
| *G02B 5/20* | (2006.01) |
| *G02B 26/00* | (2006.01) |
| *G02B 27/09* | (2006.01) |
| *G02B 27/10* | (2006.01) |

(Continued)

(52) U.S. Cl.
CPC ............. *G03B 33/12* (2013.01); *G02B 5/208* (2013.01); *G02B 5/3083* (2013.01); *G02B 26/008* (2013.01); *G02B 27/0961* (2013.01); *G02B 27/1026* (2013.01); *G02B 27/126* (2013.01); *G02B 27/141* (2013.01); *G02B 27/283* (2013.01); *G03B 21/2073* (2013.01); *G03B 21/26* (2013.01); *G03B 21/006* (2013.01)

(58) Field of Classification Search
CPC .... G03B 22/12; G03B 21/2073; G03B 21/26; G03B 21/006; G02B 5/208; G02B 5/3083; G02B 26/088; G02B 27/0961; G02B 27/1026; G02B 27/126; G02B 27/141; G02B 27/283
USPC ......................................................... 353/20
See application file for complete search history.

(56) References Cited

U.S. PATENT DOCUMENTS

| | | | |
|---|---|---|---|
| 7,934,836 B2 | 5/2011 | Ito | |
| 8,573,977 B2 | 11/2013 | Streid | |

FOREIGN PATENT DOCUMENTS

JP   2005-037689 A   2/2005

*Primary Examiner* — Steven Whitesell Gordon
*Assistant Examiner* — Jerry L Brooks
(74) *Attorney, Agent, or Firm* — Canon U.S.A., Inc., IP Division

(57) ABSTRACT

A projection-type display apparatus includes a light source unit, reflection-type light modulation elements, a color combining unit, a color separation unit, and a filter. The light source unit is capable of emitting first color light, second color light, third color light, and near infrared light. A first polarization separation unit receives the first color light, and a second polarization separation unit receives the second color light and the third color light. The color separation unit guides near infrared light to the first polarization separation unit, and the color combining unit guides the near infrared light from the first polarization separation unit to color combining unit. The projection-type display apparatus can be switched between a first mode in which a first region of the filter unit is inserted into the light path and a second mode in which a second region of the filter unit is inserted to the light path.

10 Claims, 12 Drawing Sheets

(51) Int. Cl.
*G02B 27/14* (2006.01)
*G03B 21/00* (2006.01)

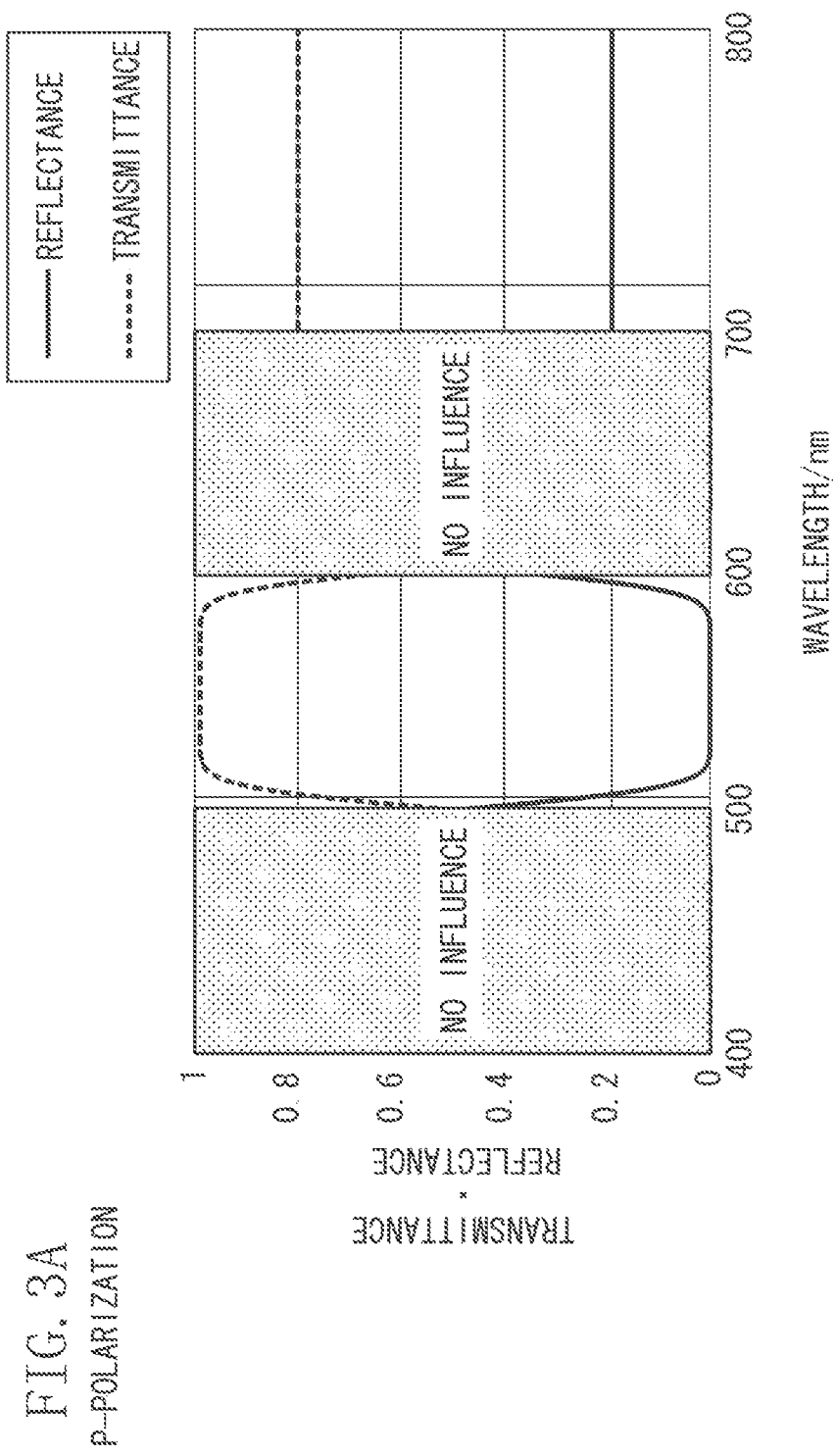

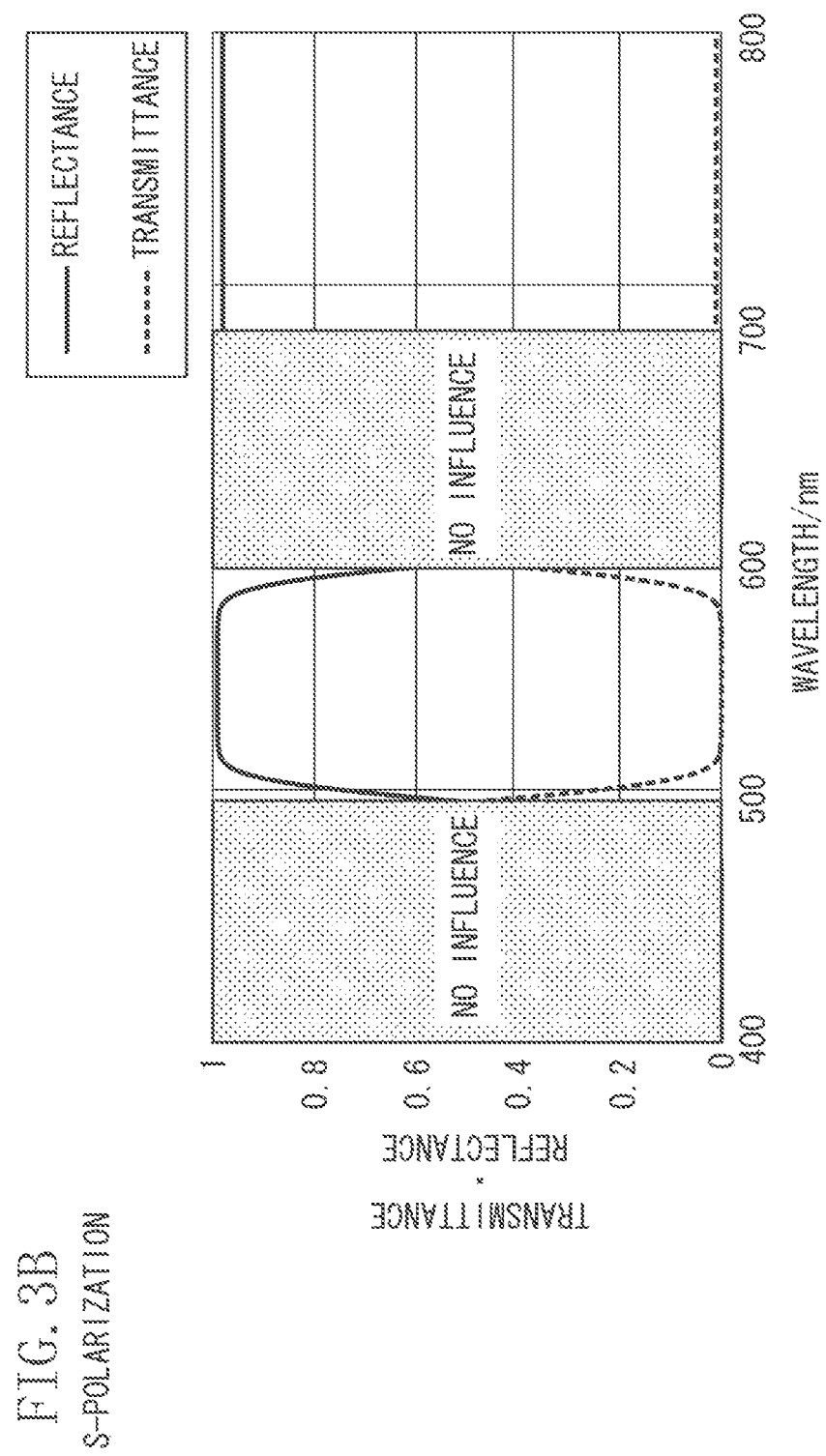

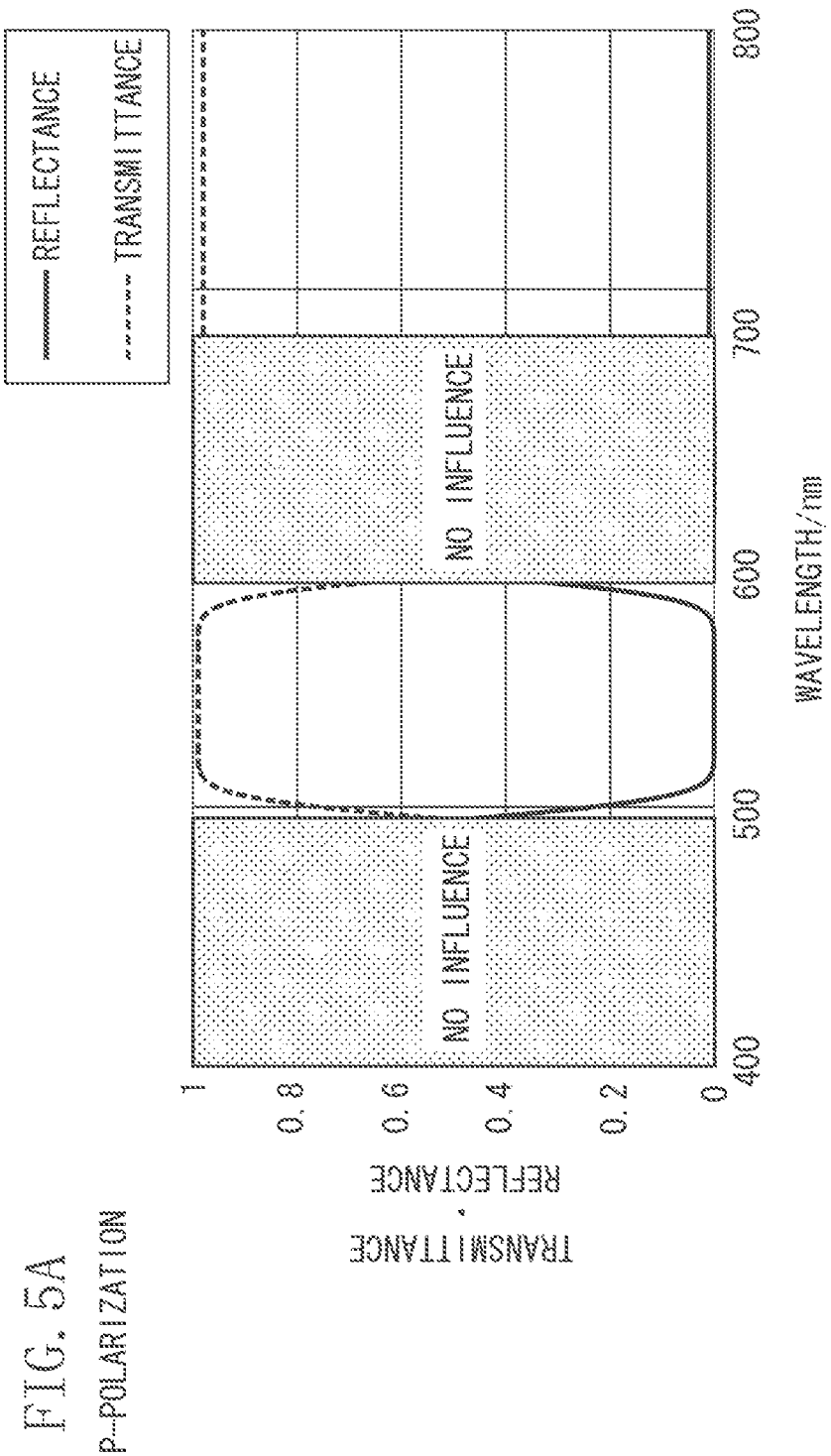

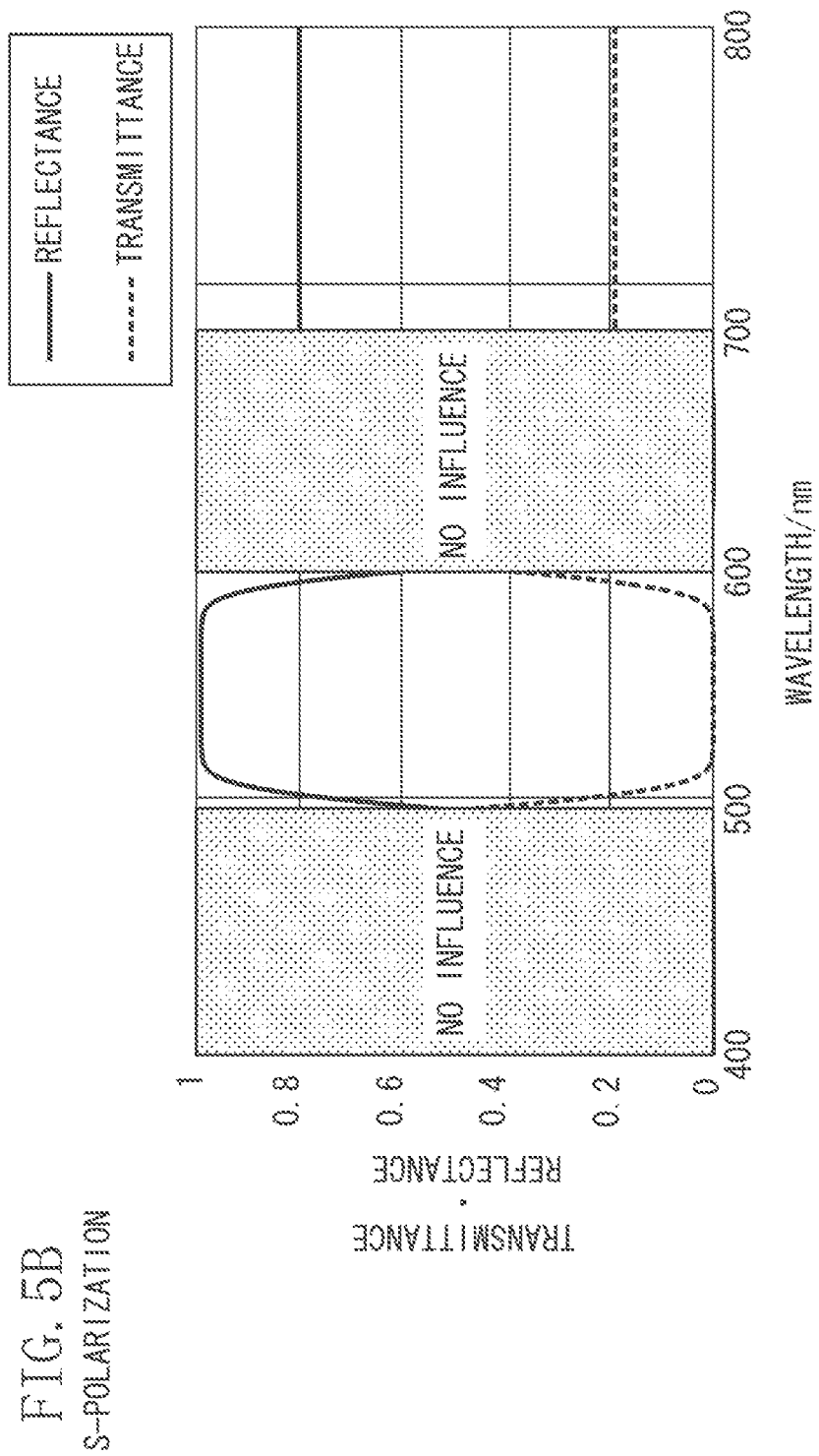

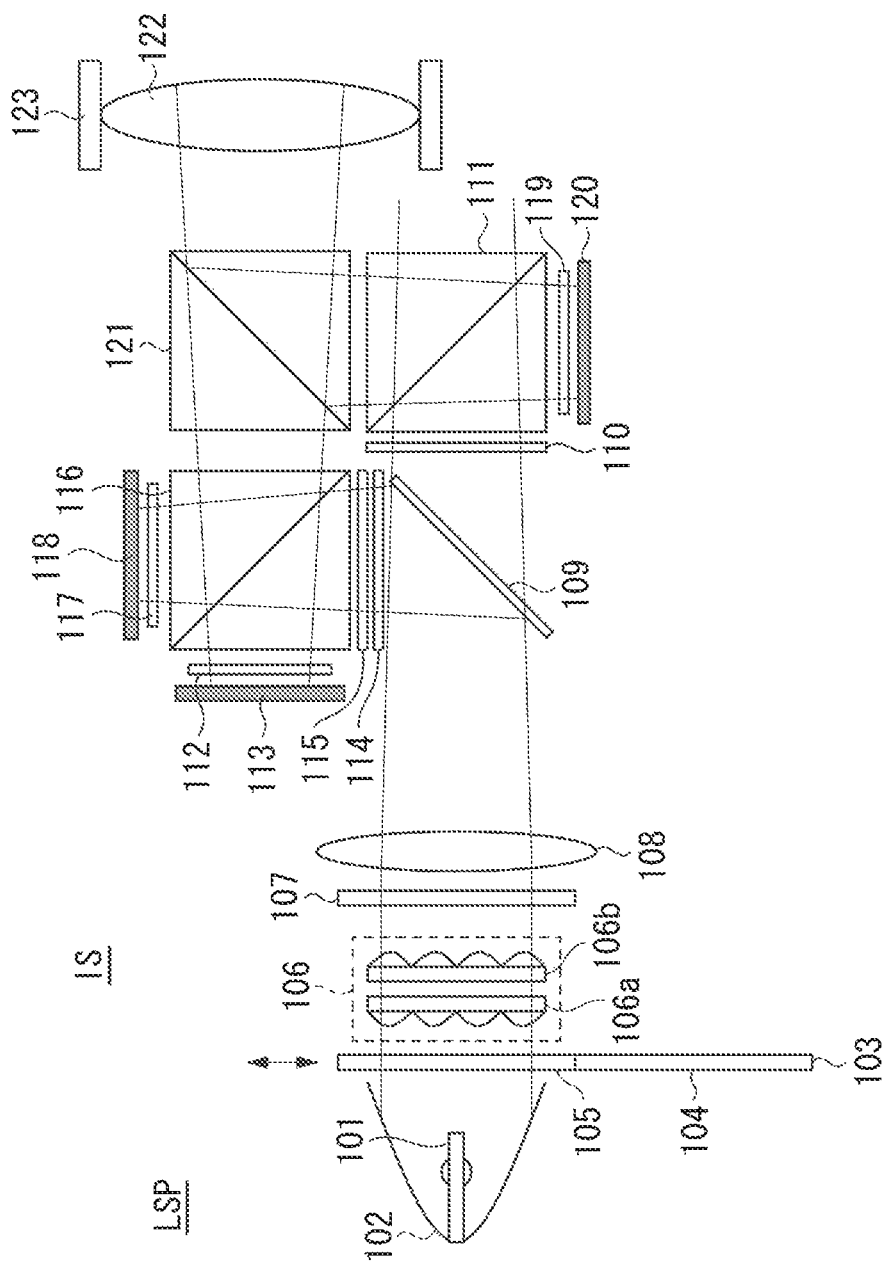

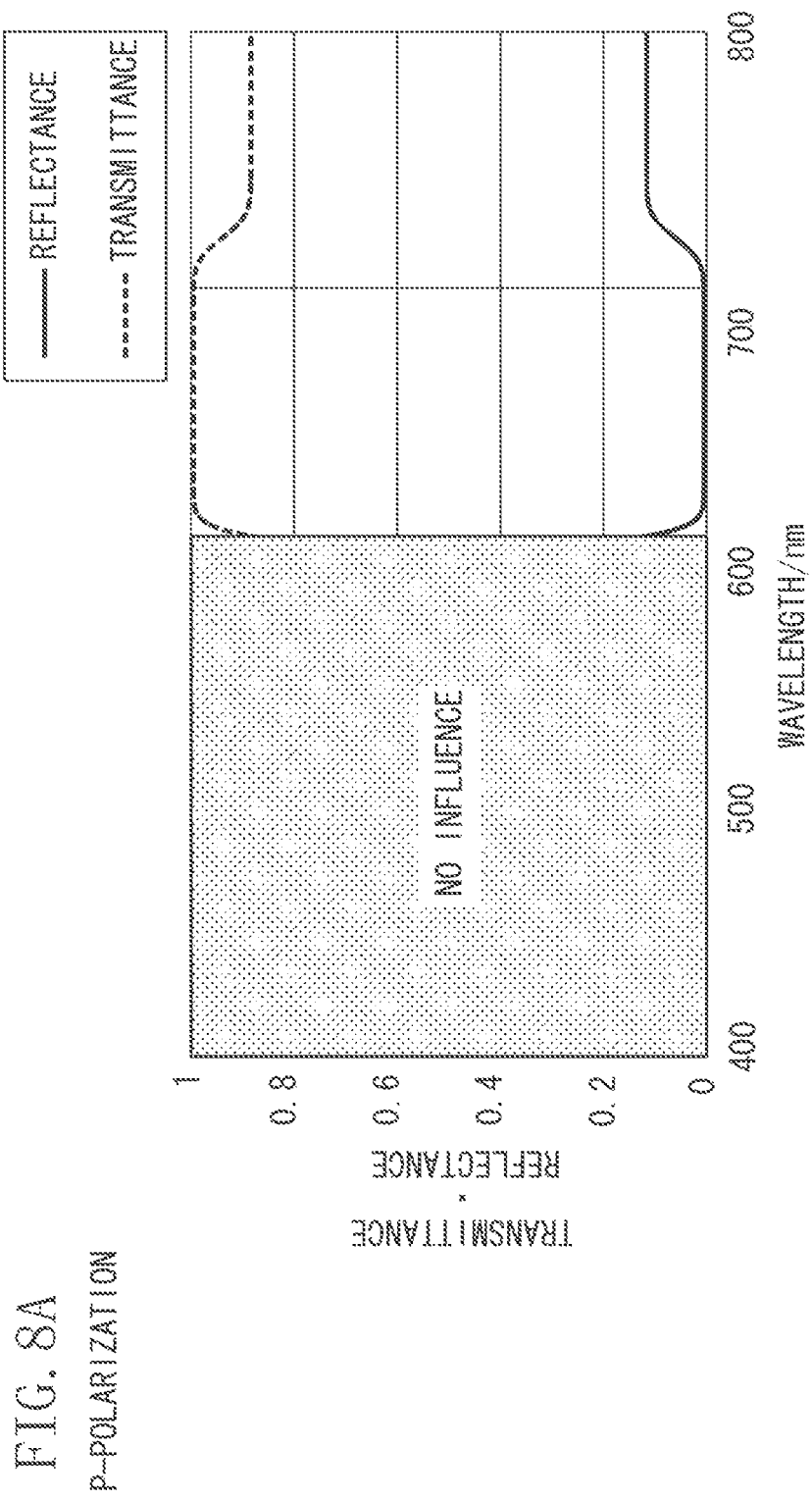

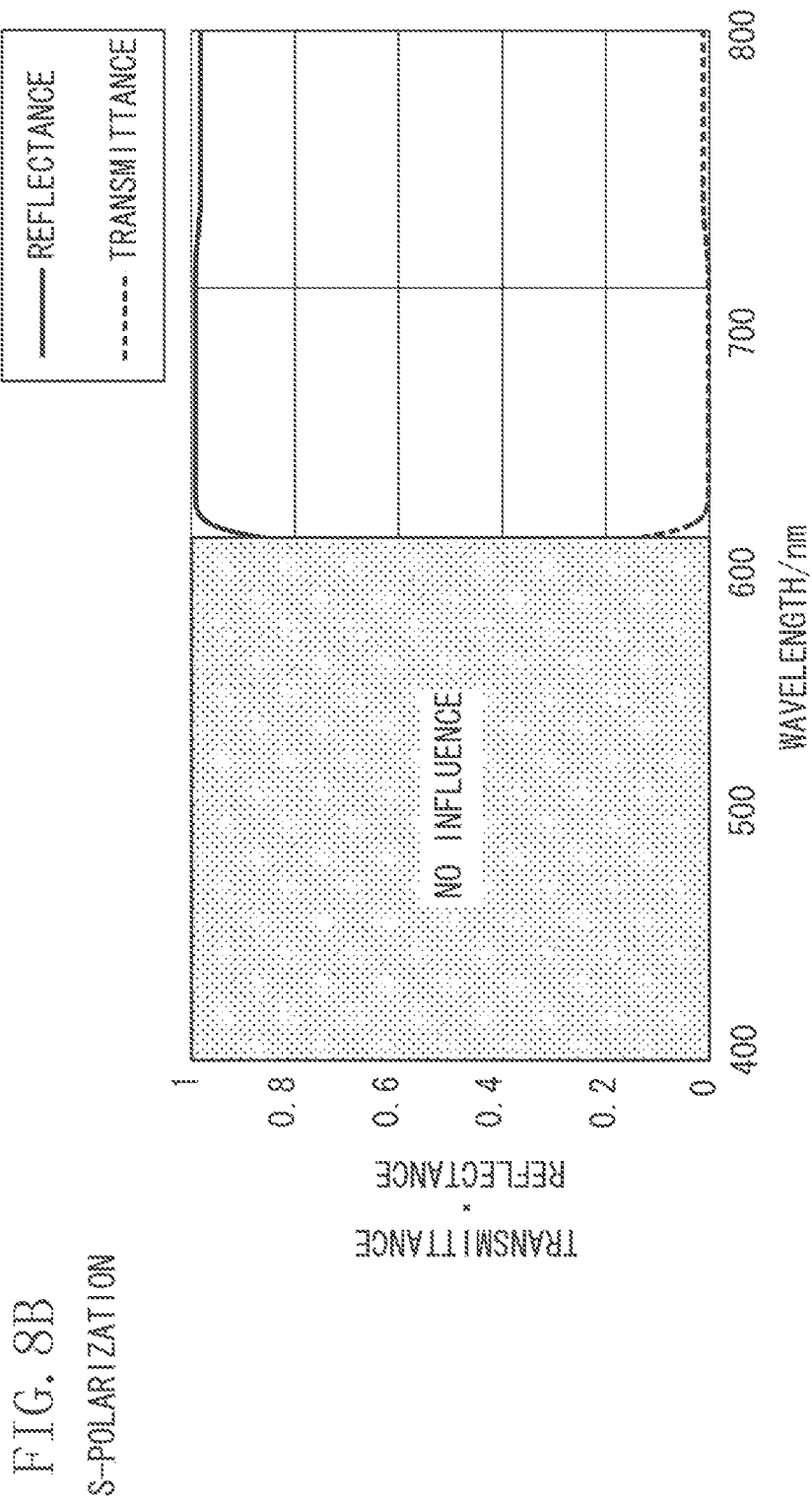

PROJECTION-TYPE DISPLAY APPARATUS

BACKGROUND OF THE DISCLOSURE

Field of the Disclosure

The present disclosure generally relates to optical devices, and in particular it relates to a projection-type display apparatus.

Description of Related Art

In recent years, for the purpose of simulation using a night-vision goggle, a projector (projection-type display apparatus) which can generate an image with near infrared light (NIR) having a wavelength of 670 nm to 1000 nm has been developed. As the above-described projector, a projector discussed in U.S. Pat. No. 8,573,977 has been known. U.S. Pat. No. 8,573,977 discusses the projector having reflection-type light modulation elements for red, green, and blue, which executes the image generation with NIR light. This projector makes NIR light enter the reflection-type light modulation element for blue that receives blue light which produces the relative visibility (relative luminosity, spectral luminous efficiency) lower than red light or green light.

The projector discussed in U.S. Pat. No. 8,573,977 includes a total of three prisms, through which light from a light source is guided to reflection-type light modulation elements for respective colors and light from the reflection-type light modulation elements for respective colors is guided to a color combining prism and a projection optical system. There is also provided a projector different from the projector described in U.S. Pat. No. 8,573,977. In this projector, light from a light source is guided to reflection-type light modulation elements for red and blue colors through one prism, and is guided to a reflection-type light modulation element for green color through another prism.

As above described, a configuration suitable for executing the image generation using NIR light through the above-described projector having a total of three prisms corresponding to reflection-type light modulation elements for respective colors is discussed in U.S. Pat. No. 8,573,977. However, a configuration suitable for executing the image generation using NIR light and executing the image generation using visible light through the projector having the total of two prisms corresponding to reflection-type light modulation elements for respective colors is not discussed in U.S. Pat. No. 8,573,977.

SUMMARY

The present disclosure is directed to a projection-type display apparatus capable of balancing contrasts of both images formed by visible light and NIR light in a configuration in which one prism is shared by two reflection-type light modulation elements.

According to an aspect of the present disclosure, a projection-type display apparatus includes a light source unit capable of emitting first color light, second color light, third color light, and near infrared light, a first reflection-type light modulation element for modulating the first color light, a second reflection-type light modulation element for modulating the second color light, a third reflection-type light modulation element for modulating the third color light, a color combining unit which combines the first color light coming from the first reflection-type light modulation element, the second color light coming from the second reflection-type light modulation element, and the third color light coming from the third reflection-type light modulation element, and guides combined light to a projection optical system, a color separation unit which guides the first color light coming from the light source unit in a direction different from a direction of the second color light and the third color light coming from the light source unit, a first polarization-separation unit which guides the first color light coming from the color separation unit to the first reflection-type light modulation element and guides the first color light coming from the first reflection-type light modulation element to the color combining unit, and a second polarization-separation unit which guides the second color light coming from the color separation unit to the second reflection-type light modulation element, guides the third color light to the third reflection-type light modulation element, and guides the second color light coming from the second reflection-type light modulation element and the third color light coming from the third reflection-type color modulation element to the color combining unit, wherein the color separation unit can guide the near infrared light coming from the light source unit to the first polarization separation unit, the color combining unit can guide the near infrared light coming from the first polarization-separation unit to the projection optical system, and the first color light is green light, the second color light is red light, and the third color light is blue light.

Further features of the present disclosure will become apparent from the following description of exemplary embodiments with reference to the attached drawings.

BRIEF DESCRIPTION OF THE DRAWINGS

FIGS. 3A and 3B are graphs schematically illustrating optical characteristics of a polarization beam splitter (PBS) prism used for the first exemplary embodiment of the present disclosure.

FIGS. 5A and 5B are graphs schematically illustrating optical characteristics of a PBS prism used for the second exemplary embodiment of the present disclosure.

FIG. 6 is a schematic diagram illustrating an optical system of a projection-type display apparatus according to a third exemplary embodiment of the present disclosure.

FIGS. 8A and 8B are graphs schematically illustrating optical characteristics of a PBS prism used for the third exemplary embodiment of the present disclosure.

DESCRIPTION OF THE EMBODIMENTS

An exemplary configuration of a waveform conversion device according to an exemplary embodiment of the present disclosure will be described herein below. It is to be understood that the scope of protection is not limited to the configuration of the below-described exemplary embodiment.

<Configuration of Optical System for Projection-Type Display Apparatus>

Figure 1:
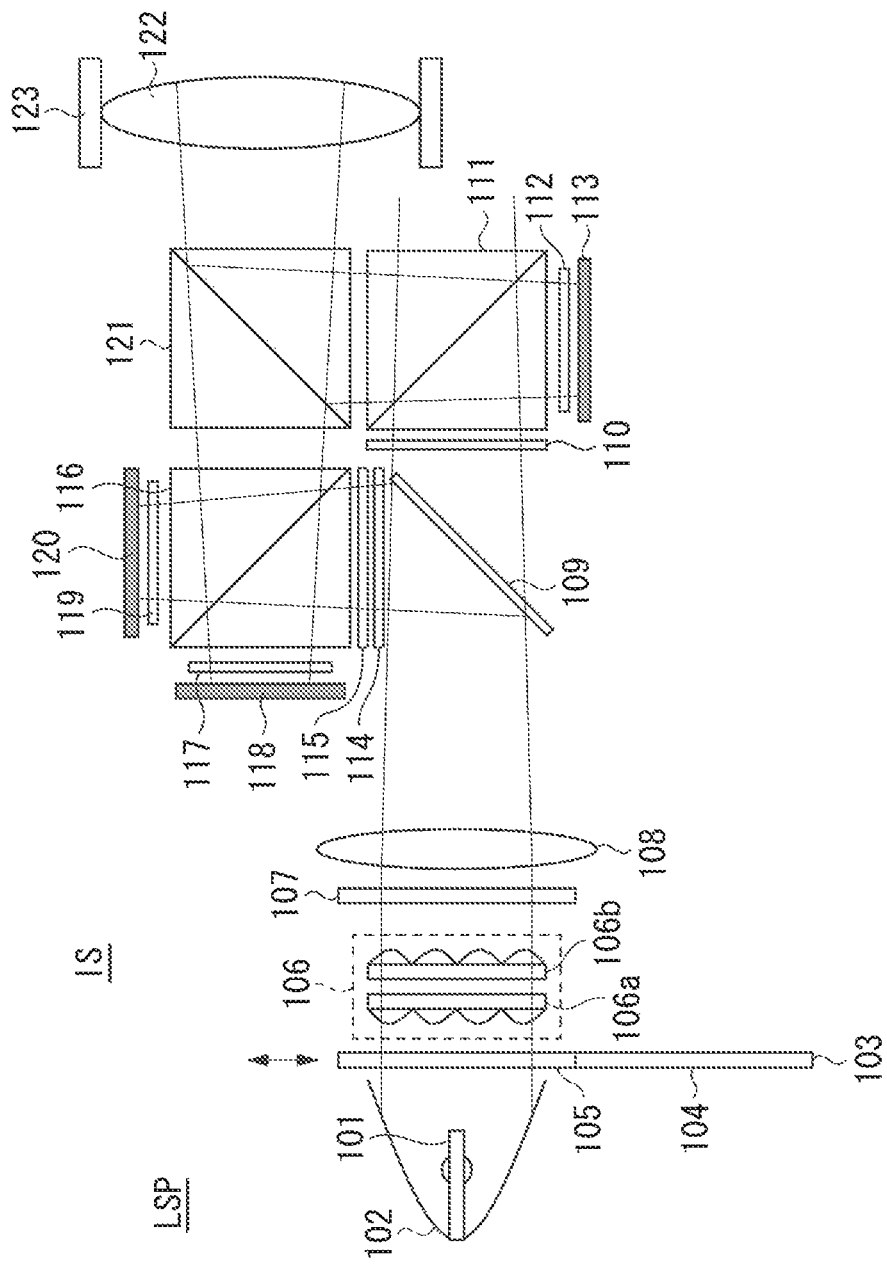
FIG. 1 is a schematic diagram illustrating an optical system of a projection-type display apparatus according to a first exemplary embodiment of the present disclosure.

FIG. 1 is a diagram illustrating a configuration of an optical system of a projection-type display apparatus according to a first exemplary embodiment. As illustrated in FIG. 1, the projection-type display apparatus includes a light source unit LSP, a filter unit 103, an illumination optical system IS, a color separation combining system and a panel portion CSCS+P, a projection optical system 122, and a holding unit 123. The projection optical system 122 may be detachably attached to the holding unit 123, or may be unremovable from (integral with) the holding unit 123.

The light source unit LSP includes a lamp light source having an extra high-pressure mercury lamp serving as a light source 101 and a reflector 102. The reflector 102 is used for making light from the light source 101 substantially parallel light. The light source unit LSP can emit green light, red light, blue light, and near infrared light (NIR light).

In this disclosure, the green light, the red light, the blue light, and the NIR light described in this exemplary embodiment and the following exemplary embodiments are defined as follows: Light (including at least a part of visible light) having a wavelength greater than 400 nm and less than 500 nm is defined as blue light, and light (including at least a part of visible light) having a wavelength greater than 500 nm and less than 600 nm is defined as green light. Then, light (including at least a part of visible light) having a wavelength greater than 600 nm and less than 670 nm is defined as red light, and light (including at least a part of visible light) having a wavelength greater than 670 nm and less than 1000 nm is defined as NIR light.

Alternatively, green light, red light, blue light, and NIR light in this exemplary embodiment and the following exemplary embodiments may be defined as follows: Light having a peak wavelength greater than 400 nm and less than 500 nm is defined as blue light, light having a peak wavelength greater than 500 nm and less than 600 nm is defined as green light, and light having a peak wavelength greater than 600 nm and less than 670 nm is defined as red light. Then, light having a peak wavelength greater than 670 nm and less than 1000 nm is defined as NIR light.

Herein, the peak wavelength refers to a wavelength having the highest intensity of wavelength bands of the light. For example, an intensity distribution of light that has entered a liquid crystal panel is measured, and a wavelength having the highest intensity may be determined as a peak wavelength of the color light based on the measurement result. Further, an intensity distribution of light that has entered a liquid crystal panel is measured, and a full width at half maximum is acquired from the measurement result. Then, an average value of a first wave length and a second wavelength longer than the first wavelength, which constitute the full width at half maximum, may be used in substitution for the peak wavelength.

The filter unit 103 includes a first region 104 and a second region 105, and either one of the first region 104 and the second region 105 can be inserted to a light path. The first region 104 is a low pass filter which transmits light having a wavelength less than 670 nm and suppresses the transmission (reflects or absorbs) of light having a wavelength greater than 670 nm. Therefore, the projection-type display apparatus projects visible light to form a visible image when the first region 104 of the filter-unit 103 is inserted into the light path. Further, the second region 105 is a high-pass filter which transmits light having a wavelength greater than 670 nm and suppresses transmission (reflects or absorbs) of light having a wavelength less than 670 nm. Therefore, the projection-type display apparatus projects NIR light to form a NIR image when the second region 105 of the filter unit 103 is inserted into the light path.

In other words, the filter unit 103 includes the first region 104 which transmits the first color light, the second color light, and the third color light emitted from the light source unit LSP and suppresses transmission of the NIR light from the light source unit LSP. Further, the filter unit 103 includes the second region 105 which suppresses transmission of the first color light, the second color light, and the third color light emitted from the light source unit LSP and transmits the NIR light from the light source unit LSP. By inserting or removing the filter unit 103 to/from the optical path of the light emitted from the light source unit LSP, the projection-type display apparatus can be switched between a visible light mode (first mode) for projecting a visible light image and a NIR mode (second mode) for projecting a NIR image.

The illumination optical system IS includes an integrator optical system 106, a polarization conversion element 107, and a condenser lens unit 108. The integrator optical system 106 is an optical system which includes a first fly-eye lens 106a and a second fly-eye lens 106b, and makes an illumination distribution on the below-described liquid crystal panel uniform. The polarization conversion element 107 is an optical element (a polarizer) for converting unpolarized light coming from the light source unit LSP into polarized light uniformed in a predetermined polarization direction. The condenser lens unit 108 is an optical system for superimposing the light from the light source unit LSP, which is divided by the first fly-eye lens 106a, on the liquid crystal panel described below.

The color separation combining system CSCS includes a dichroic mirror (color separation unit) 109, a first polarization plate 110, a first PBS prism (first polarization separation unit) 111, and a green phase compensation plate (first phase compensation plate) 112. The color separation combining system CSCS further includes a second polarization plate 114, a first wavelength-selective phase plate 115, and a second PBS prism (second, polarization separation unit) 116. The color separation combining system. CSCS further includes a blue phase compensation plate (third phase compensation plate) 117, a red phase compensation plate (second phase compensation plate) 119, and a color combining prism (color combining unit) 121.

Figure 2:
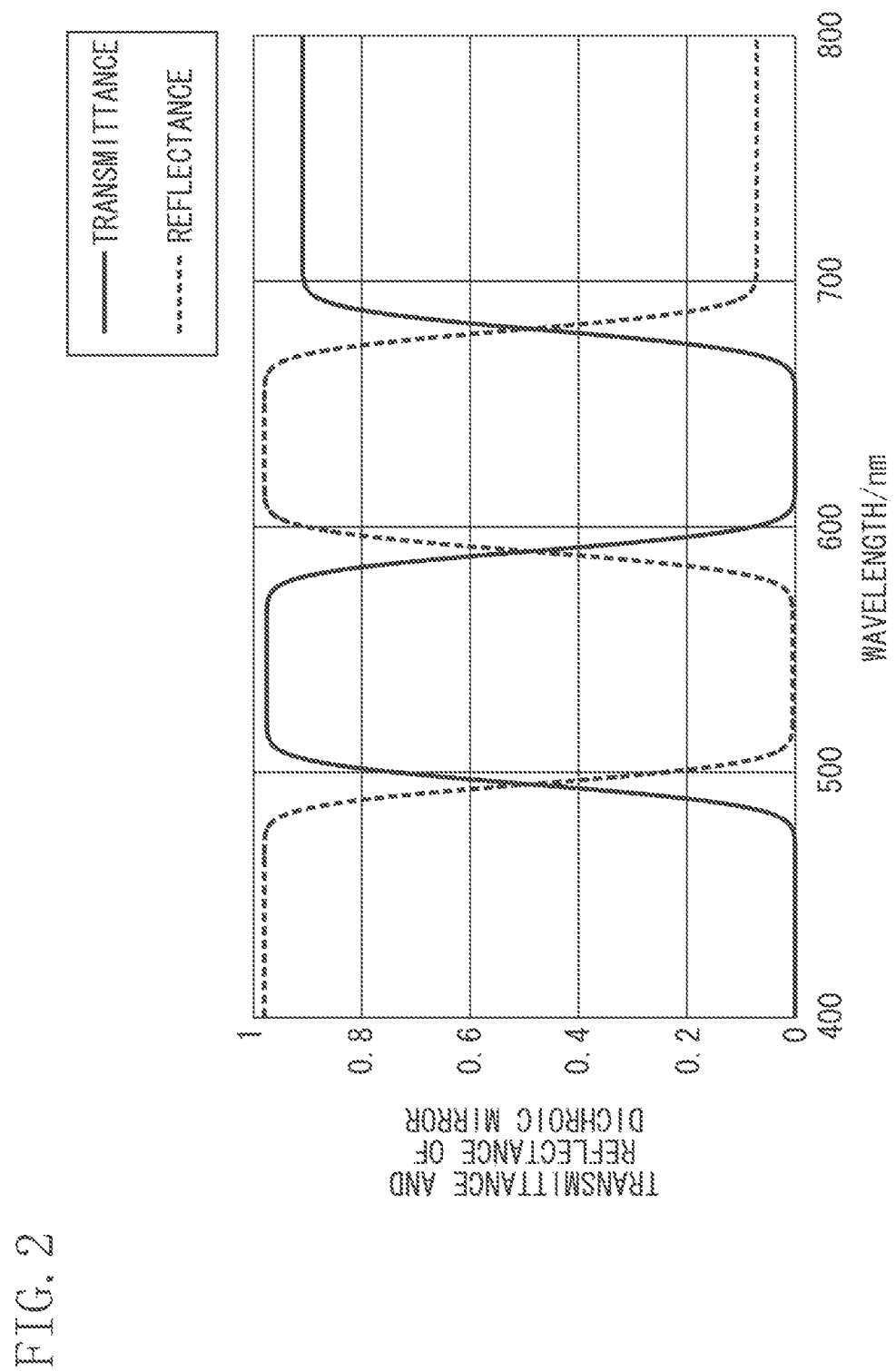
FIG. 2 is a graph schematically illustrating optical characteristics of a dichroic mirror used for the first exemplary embodiment of the present disclosure.

FIG. 2 is a graph illustrating a transmission characteristic and a reflection characteristic of the dichroic mirror 109 at an incident angle of 45-degree. As illustrated in FIG. 2, in the present exemplary embodiment, in addition to green light, most of the NIR light having the wavelength of 670 nm or more passes through the dichroic mirror 109 and is guided to the first polarization plate 110 and the first PBS prism 111. Then, red light and blue light are reflected on the dichroic mirror 109. Specific light paths of light of respective colors will be described below.

The panel portion P includes a green liquid crystal panel (first reflection-type light modulation element) 113 for modulating green light (first color light) coming from the light source unit LSP, a red liquid crystal panel (second reflection-type light modulation element) 120 for modulating red light (second color light). The panel unit P further includes a blue liquid crystal panel (third reflection-type light modulation element) 118 for modulating blue light (third color light). The liquid crystal panels 113, 118, and 120 are reflection-type liquid crystal panels.

<Light Path in Visible Light Mode>

First, a path of light from the light source unit LSP in the visible light mode will be described in a case where the first region 104 is inserted in front of the light source unit LSP.

The dichroic mirror 109 reflects red light and blue light of white light emitted from the light source unit LSP and transmits green light to divide the light beams. In other words, the dichroic mirror 109 is a color separation unit which guides green light coming from the light source unit LSP in a direction different from directions of red light and blue light from the light source unit LSP. The polarization degree of the green light is increased by the first polarization plate 110 that transmits only light of a predetermined polarization direction. After that, the green light from the dichroic mirror 109 enters the green liquid crystal panel 113 via the first PBS prism 111 and the green phase compensation plate 112. Then, the green liquid crystal panel 113 modulates the green light that has entered the green liquid crystal panel 113, according to an image source input to the projection-type display apparatus.

The green light modulated by the green liquid crystal panel 113 enters the color combining prism 121 via the green phase compensation plate 112 and the first PBS prism 111. In other words, the first PBS prism 111 guides the green light from the dichroic mirror 109 to the green liquid crystal panel 113 and guides the green light from the green liquid crystal panel 113 to the color combining prism 121.

After the polarization degrees of the red light and the blue light are increased by the second polarization plate 114, the red light and the blue light are respectively converted into P-polarized red light and S-polarized blue light by the first wavelength-selective phase plate 115, and guided to the second PBS prism 116. The second PBS prism 116 transmits the red light that has entered the second PBS prism 116 as P-polarized light, and reflects the blue light that has entered the second PBS prism 116 as S-polarized light. The red light that has passed through the second PBS prism 116 enters the red liquid crystal panel 120 via the red phase compensation plate 119, and the blue light reflected on the second PBS prism 116 enters the blue liquid crystal panel 118 via the blue phase compensation plate 117. Then, according to the image source input to the projection-type display apparatus, the red liquid crystal panel 120 modulates the red light that has entered the red liquid crystal panel 120, and the blue liquid crystal panel 118 modulates the blue light that has entered the blue liquid crystal panel 118.

The red light modulated by the red liquid crystal panel 120 enters the color combining prism 121 via the red phase compensation plate IIS and the second PBS prism 116. Then, the blue light modulated by the blue liquid crystal panel 118 enters the color combining prism 121 via the blue phase compensation plate 117 and the second PBS prism 116.

The color combining prism 121 is a dichroic prism which reflects green light and transmits red light and blue light. The color combining prism 121 also has a characteristic of reflecting NIR light as described below. Therefore, the green light from the first PBS prism 111 reflected on the color combining prism 121 enters the projection optical system 122. Then, the red light and the blue light from the second PBS prism 116 pass through the color combining prism 121 and enter the projection optical system 122. As a result, a color image (visible light image) can be projected and displayed on a screen.

<Light Path in NIR Mode>

Next, a light path of light from the light source unit LSP in the NIR mode in which the second region 105 is inserted in front of the light source unit LSP will be described. As described above, because the second region 105 is a high-pass filter that transmits light having a wavelength greater than 670 nm and suppresses transmission of light having less than 670 nm, in the NIR mode, mainly NIR light enters the dichroic mirror 109 via the illumination optical system IS. The NIR light from the light source unit LSP passes through the dichroic mirror 109 and enters the first PBS prism 111 via the first polarization plate 110. In other words, the dichroic mirror 109 can guide the NIR light from the light source unit LSP to the first PBS prism 111.

The NIR light that has entered the first PBS prism 111 is reflected on the first PBS prism 111 and enter the green liquid crystal panel 113 via the green phase compensation plate 112. Then, according to the image source input to the projection-type display apparatus, the green liquid crystal panel 113 modulates the NIR light that has entered the green liquid crystal panel 113. The NIR light modulated by the green liquid crystal panel 113 enters the color combining prism 121 via the green phase compensation plate 112 and the first PBS prism 111. The NIR light that has entered the color combining prism 121 is reflected on the color combining prism 121 and enters the projection optical system 122. In other words, the color combining prism 121 can guide the NIR light from the first PBS prism 111 to the projection optical system 122. As a result, the NIR image can be projected and displayed on the screen.

<Effect Acquired by the Present Exemplary Embodiment>

As described above, in the present exemplary embodiment, green light, red light, and blue light as visible light are separated into a light flux that includes only green light, and a light flux that includes light of two colors, i.e., red light and blue light. Then, the color separation combining system CSCS includes two prisms corresponding to respective reflection-type light modulation elements. In other words, one prism is shared by two reflection-type light modulation elements.

In the above-described configuration, a characteristic of the second PBS prism 116 has to be optimized with respect to light of two colors (in the present exemplary embodiment, red light and blue light). Therefore, contrast of an image formed by light of two colors guided to the screen by the second PBS prism 116 tends to be lower than contrast of an image formed by light of one color guided to the screen by the first PBS prism 111. Further, in the present exemplary embodiment, from among green light, red light, and blue light, green light producing the highest relative visibility enters the first PBS prism 111 as the light of one color. Therefore, contrast of the image formed by green light producing high relative visibility can be prevented from decreasing.

A tentative configuration different from the present exemplary embodiment will be considered in which the NIR light that has entered the second PBS prism 116 is modulated by the red liquid crystal panel 120 or the blue liquid crystal panel 118. In this tentative configuration, red light and blue light enter the second PBS prism 116 in the visible light mode, and NIR light enters the second PBS prism 116 in the NIR mode. Therefore, in the tentative configuration, the second PBS prism 116 needs to be optimized with respect to red light, blue light and NIR light. However, it is difficult to optimize the characteristic of a polarization separation film included in the second PBS prism 116 with respect to light of three colors.

If the characteristic of the polarization separation film included in the second PBS prism 116 is to be optimized with respect to light of three colors, the total number of films will be increased. Further, as described above, even if the total number of films is increased, it is difficult to optimize the characteristic of the polarization separation film included in the second PBS prism 116 with respect to light of three colors. If image quality of an image in the visible light mode (contrast, in particular, the same applies hereinafter) is prioritized, and thus the polarization separation film included in the second PBS prism 116 has such a characteristic that a priority is placed on the performance in red light and blue light, image quality of an image in the NIR mode will become deteriorated. On the other hand, if image quality of an image in the NIR mode is prioritized, and thus the polarization separation film included in the second PBS prism 116 has such a characteristic that a priority is placed on performance in NIR light, image quality of an image in the visible light mode will become deteriorated.

In other words, if NIR light that has entered the second PBS prism 116 is modulated by the red liquid crystal panel 120 or the blue liquid crystal panel 118 as a tentative configuration, it is difficult to achieve a balance of the image quality of both the image formed by visible light and the image formed by NIR light. Therefore, in the present exemplary embodiment, NIR light enters the first PBS prism 111 instead of the second PBS prism 116. In other words, light of two colors (i.e., green light and NIR light) enters the first PBS prism 111, and light of two colors (i.e., red light and blue light) enters the second PBS prism 116.

As described above, green light enters the first PBS prism 111 in the visible light mode, and NIR light enters the first PBS prism 111 in the NIR mode. Therefore, the characteristic of the polarization separation film included in the first PBS prism 111 has to be optimized only with respect to light of two colors in total, i.e., green light and NIR light. In other words, in comparison to the tentative configuration in which the characteristic of the polarization separation film has to be optimized with respect to light of three colors, the characteristic of the polarization separation unit may be optimized with respect to light of two colors at the maximum in the configuration described in the present exemplary embodiment. Therefore, according to the configuration described in the present exemplary embodiment, one prism is shared by two reflection-type light modulation elements and image quality of both the images formed by visible light and NIR light can be balanced.

<Characteristics of The First PBS Prism 111>

A more specific characteristic of the first PBS prism 111 will be described with reference to FIGS. 3A and 3B. Characteristics of the first PBS prism 111 with respect to P-polarized light and S-polarized light in the present exemplary embodiment are illustrated in FIGS. 3A and 3B, respectively.

As illustrated in FIG. 3A, the first PBS prism 111 shows high transmittance (80% or more) with respect to P-polarized green light and P-polarized NIR light having the wavelength of 670 nm or more. Further, as illustrated in FIG. 3B, the first PBS prism 111 shows low transmittance (reduced to 10% or lower) with respect to S-polarized green light and S-polarized NIR light having the wavelength of 670 nm or more. Therefore, balance of contrast can be achieved in both of the images formed by the visible light and the NIR light. Further, the second PBS prism 116 shows high transmittance (80% or more) with respect to S-polarized red light and low transmittance (reduced to 10% or lower) with respect to S-polarized blue light.

As described above, in the present exemplary embodiment, NIR light enters the first PBS prism 111. With this configuration, it is possible to realize a projection-type display apparatus capable of balancing image quality of both the images formed by visible light and NIR light in which one prism is shared by two reflect ion-type light modulation elements.

Figure 4:
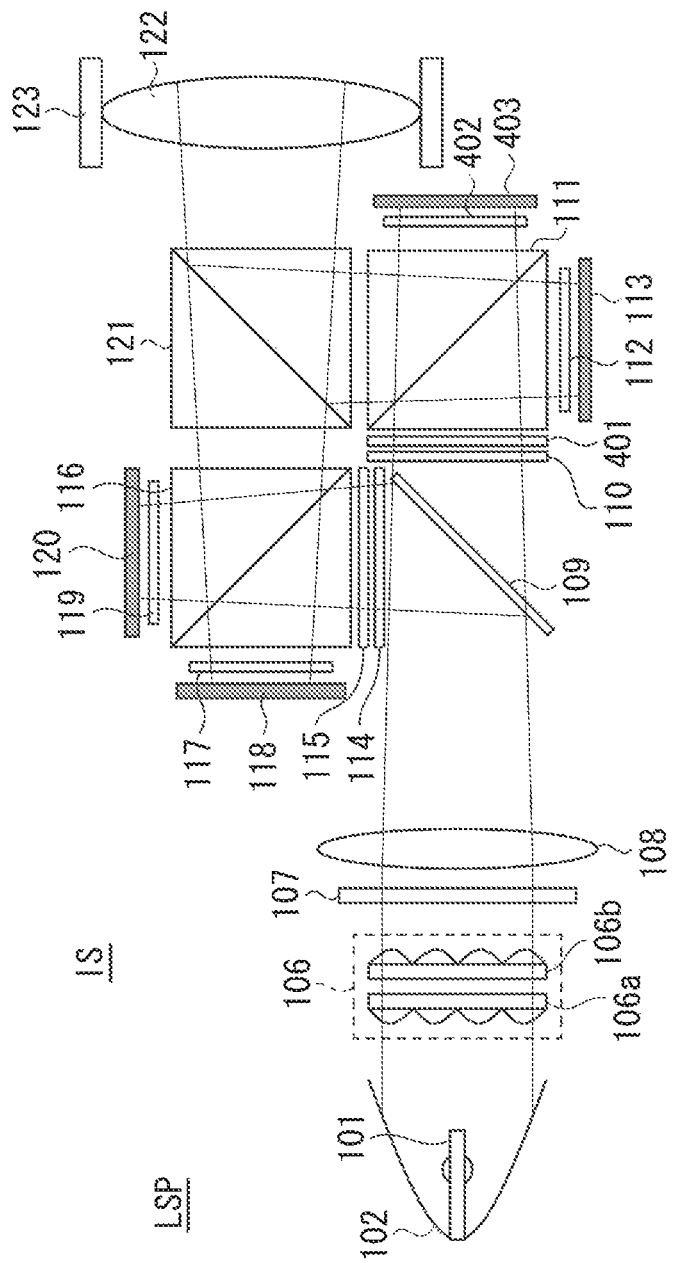
FIG. 4 is a schematic diagram illustrating an optical system of a projection-type display apparatus according to a second exemplary embodiment of the present disclosure.

A configuration of a n optical system of a projection-type display apparatus according to a second exemplary embodiment will be described with reference to FIG. 4. Description of members having reference numerals same as those in the first exemplary embodiment will be partially omitted. The present exemplary embodiment is different from the first exemplary embodiment in that the optical system includes a second wavelength-selective phase plate 401, an NIR phase compensation plate 402, and an NIR liquid crystal panel 403 in addition to the configuration described in the first exemplary embodiment, and does not include the filter unit 103.

<Light Path of Each Color light in Second Exemplary Embodiment>

As described above, because the filter unit 103 is not included in the configuration described in the present exemplary embodiment, green light, red light, blue light, and NIR light from the light source unit LSP enter the dichroic mirror 109 simultaneously via the illumination optical system IS. Then, green light and NIR light from the dichroic mirror 109 enter the first polarization plate 110 and the second wavelength-selective phase plate 401 simultaneously. The second wavelength-selective phase plate 401 is arranged between the first polarization plate 110 and the first PBS prism 111, and converts the polarization of the NIR light into P-polarization while maintaining the s-polarization of the green light. In other words, the second wavelength-selective phase plate 401 is a wavelength-selective phase plate which converts one of the polarization states of the first color light and the near infrared light from the dichroic mirror 109 while maintaining another polarization state. The green light as the S-polarized light coming from the second wavelength-selective phase plate 401 follows the same light path as the light path at the time of the visible light mode in the first exemplary embodiment, and is projected and displayed on a screen.

The NIR light, which is the P-polarized light from the second wavelength-selective phase plate 401, passes through the first PBS prism 111 and enters the NIR liquid crystal panel (fourth reflection-type light modulation element) 403 via the NIR phase compensation plate (fourth phase compensation plate) 402. Then, according to the image source input to the projection-type display apparatus, the NIR liquid crystal panel 403 modulates the NIR light that has entered the NIR liquid crystal panel 403. The NIR light modulated by the NIR liquid crystal panel 403 enters the color combining prism 121 via the NIR phase compensation plate 402 and the first PBS prism 111. The NIR light that has entered the color combining prism 121 is reflected on the color combining prism 121 and enters the projection optical system 122. Light paths of the red light and the blue light are similar to the light paths at the time of the visible light mode in the first exemplary embodiment.

As described above, the projection-type display apparatus of the present exemplary is similar to the first exemplary embodiment in that the NIR light enters the first PBS prism 111. Further, the projection-type display apparatus of the present exemplary is different from the first exemplary embodiment in that the images formed by the visible light and the NIR light can be projected and displayed on the screen simultaneously.

<Characteristics of The First PBS Prism 111 in The Present Exemplary Embodiment>

A characteristic of the first PBS prism 111 in the present exemplary embodiment will be described with reference to FIGS. 5A and 5B. Characteristics of the first PBS prism 111 with respect to P-polarized light and S-polarized light in the present exemplary embodiment are illustrated in FIGS. 5A and 5B, respectively. As illustrated in FIG. 5A, the first PBS prism 111 in the present exemplary embodiment has low reflectance (reduced to 10% or lower) with respect to P-polarized NIR light having the wavelength of 670 nm or more. Further, as illustrated in FIG. 5B, the first PBS prism 111 in the present exemplary embodiment has high reflectance (80% or more) with respect to S-polarized NIR light having the wavelength of 670 nm or more. The characteristic of the second PBS prism 116 is similar to the first exemplary embodiment. Therefore, in the present exemplary embodiment, high contrast can be achieved with respect to the image of the NIR light as well as the image of the visible light.

<Effect Acquired by The Present Exemplary Embodiment>

As described above, in the present exemplary embodiment, NIR light also enters the first PBS prism 111. Thus, it is possible to realize a projection-type display apparatus capable of balancing image quality of both images formed by visible light and NIR light through the configuration in which one prism is shared by two reflection-type light modulation elements. Further, according to the present exemplary embodiment, it is possible to project and display images formed by the visible light and the NIR light simultaneously, while quality of both images formed by the visible light and the NIR light is balanced with each other.

Hereinafter, a third exemplary embodiment will be described. A configuration of an optical system of a projection-type display apparatus according to the present exemplary embodiment will be described with reference to FIG. 6. Description of members having the same reference numerals as those in the above-described first exemplary embodiment will be partially omitted. The present exemplary embodiment is different from the first exemplary embodiment in the characteristics of the dichroic mirror 109, the first wavelength-selective phase plate 115, and the first PBS prism 111, and the arrangement of respective liquid crystal panels.

Figure 7:
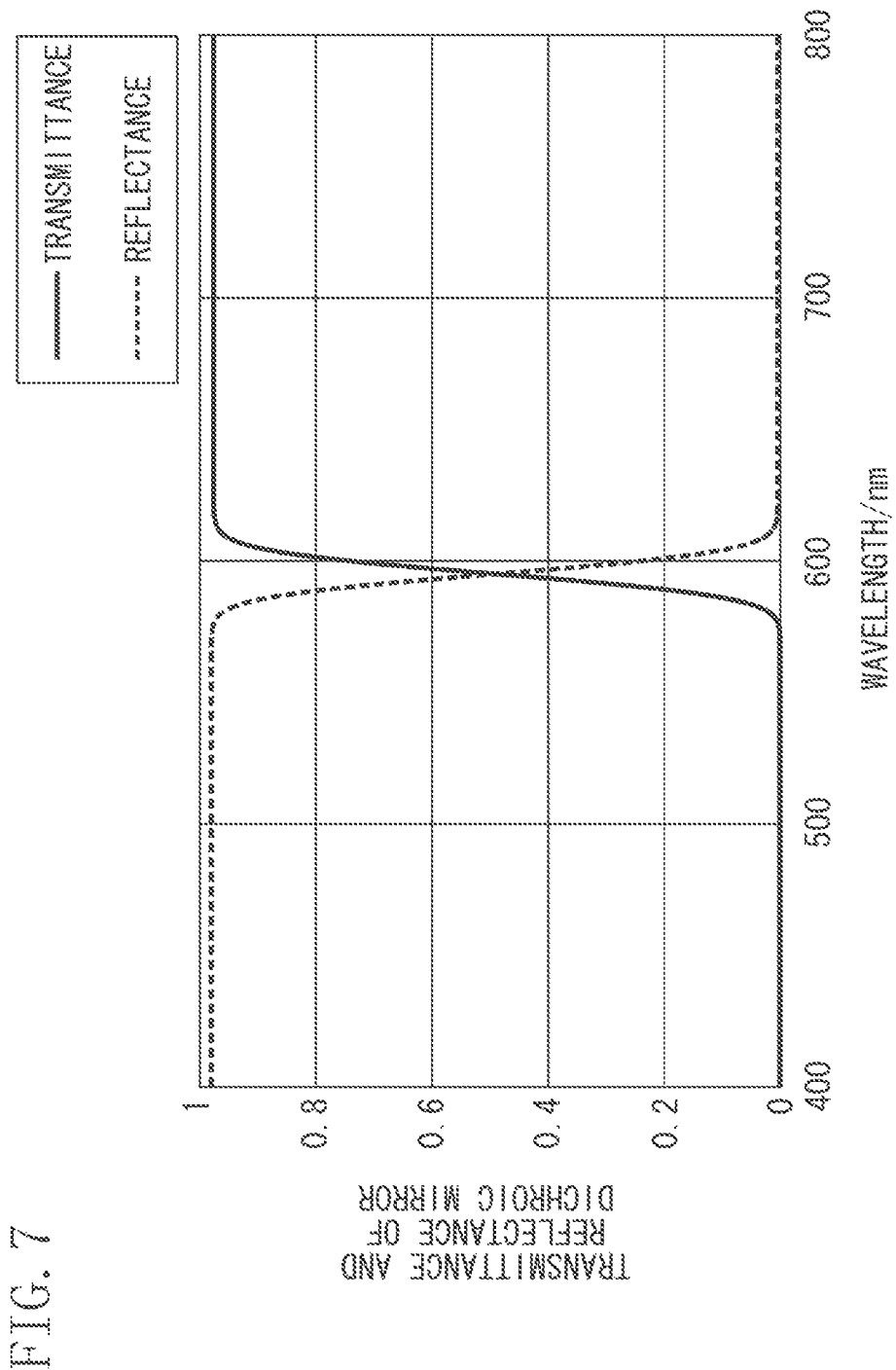
FIG. 7 is a graph schematically illustrating optical characteristics of a dichroic mirror used for the third exemplary embodiment of the present disclosure.

FIG. 7 is a graph illustrating a transmission characteristic and a reflection characteristic of the dichroic mirror 109 at an incident angle of 45-degree. The dichroic mirror 109 in the first exemplary embodiment has a characteristic of transmitting green light and reflecting red light and blue light. On the contrary, as illustrated in FIG. 7, the dichroic mirror 109 according to the present exemplary embodiment has a characteristic of reflecting green light and blue light and transmitting red light. Therefore, in the present exemplary embodiment, a red phase compensation plate 119 and a red liquid crystal panel 120 are arranged in a direction in which the red light passes through the dichroic mirror 109 and is reflected on the first PBS prism 111. Further, a blue phase compensation plate 117 and a blue liquid crystal panel 118 are arranged in a direction in which the blue light is reflected on the dichroic mirror 109 and passes through the second PBS prism 116. Then, a green phase compensation plate 112 and a green liquid crystal panel 113 are arranged in a direction in which the green light is reflected on the dichroic mirror 109 and on the second PBS prism 116. Further, the first wavelength-selective phase plate 115 maintains the polarization of green light at S-polarization and converts the polarization of blue light into P-polarization.

Characteristics of the first PBS prism 111 with respect to P-polarized light and S-polarized light in the present exemplary embodiment are illustrated in FIGS. 8A and 8B, respectively. As illustrated in FIG. 8A, the first PBS prism 111 in the present exemplary embodiment has low reflectance (reduced to 20% or lower) with respect to P-polarized red light and P-polarized NIR light having the wavelength of 670 nm or more. Further, as illustrated in FIG. 8B, the first PBS prism 111 in the present exemplary embodiment has low transmittance (reduced to 10% or lower) with respect to S-polarized red light and NIR light having the wavelength of 670 nm or more.

<Effect Acquired by Present Exemplary Embodiment>

As described above, in the first exemplary embodiment, the first color light entering the first PBS prism 111 is green light, and the second color light and the third color light entering the second PBS prism 116 are red light and blue light respectively. On the other hand, in the present exemplary embodiment, the first color light entering the first PBS prism 111 is red light, the second color light and the third color light entering the second PBS prism 116 are green light and blue light respectively, and NIR light also enters the first PBS prism 111.

In other words, in comparison to the first exemplary embodiment, wavelengths of the light of two colors (i.e., red light and NIR light) passing through the dichroic mirror 109 are close to each other, and wavelengths of the light of two colors (i.e., blue light and green light) reflected on the dichroic mirror 109 are close to each other. Therefore, in comparison to the first exemplary embodiment, the dichroic mirror 109 is easy to design. Further, because wavelengths of the light of two colors (i.e., red light and NIR light) entering the first PBS prism 111 are close to each other, the first PBS prism 111 according to the present exemplary embodiment is easy to design in comparison to the first exemplary embodiment.

Since the first color light and the NIR light enter the first PBS prism 111, naturally, an effect similar to the effect acquired by the above-described respective exemplary embodiments can be also acquired in the present exemplary embodiment. In other words, it is possible to realize a projection-type display apparatus capable of balancing quality of both images formed by visible light and NIR light through the configuration in which one prism is shared by two reflection-type light modulation elements.

Figure 9:
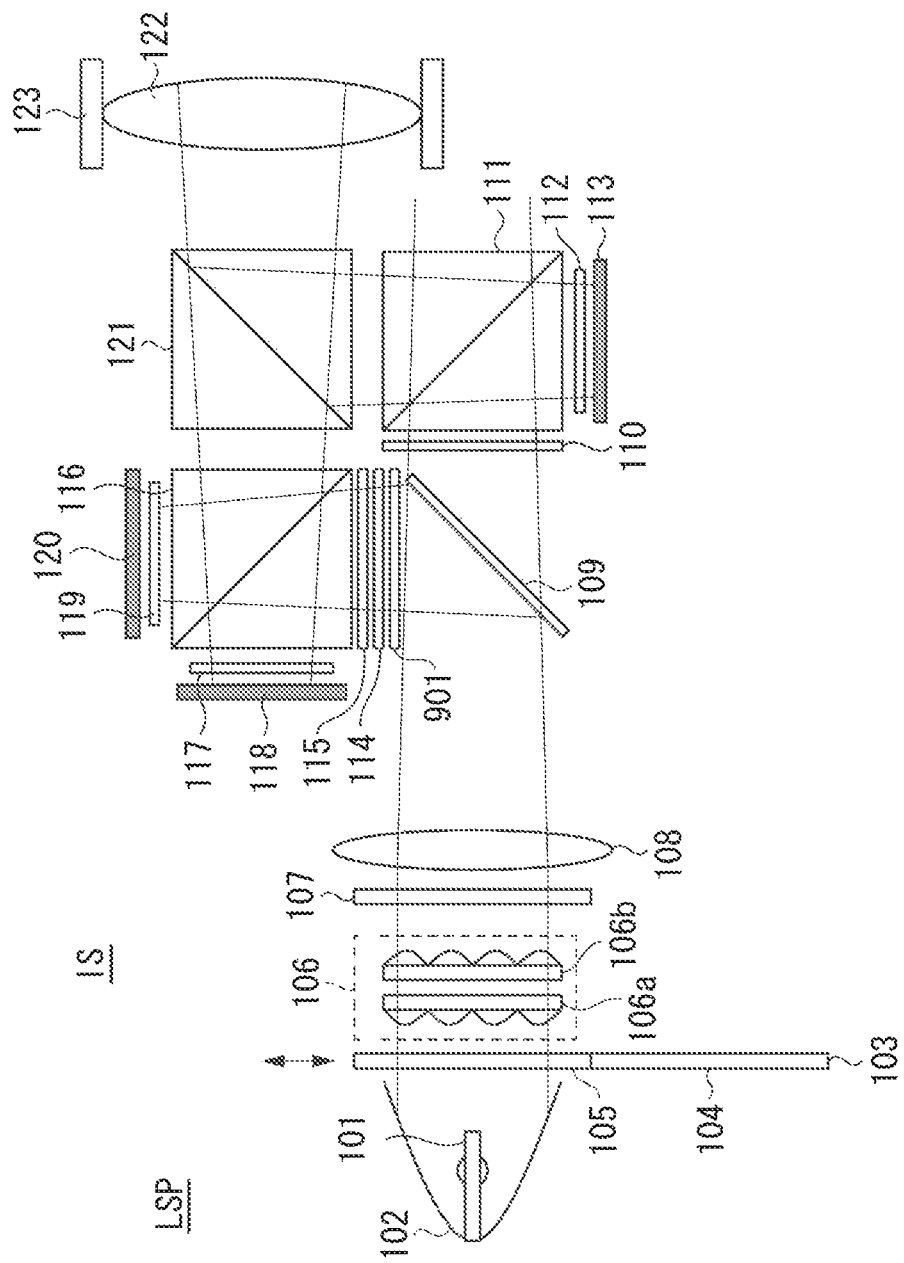
FIG. 9 is a schematic diagram illustrating an optical system of a projection-type display apparatus according to a fourth exemplary embodiment of the present disclosure.

Hereinafter, a fourth exemplary embodiment will be described. A configuration of an optical system of a projection-type display apparatus of the present exemplary embodiment will be described with reference to FIG. 9. In addition, description of members having same reference numerals as those in the above-described first exemplary embodiment will be partially omitted. The present exemplary embodiment is different from the above-described first exemplary embodiment in that the optical system further includes an NIR cut filter 901.

The NIR cut filter 901 is arranged between the dichroic mirror 109 and the second PBS prism 116. More specifically, the NIR cut filter 901 is arranged between the dichroic mirror 109 and the second, polarization plate 114. The NIR cut filter 901 is a dichroic element (color separation element) that transmits visible light having a wavelength less than 670 nm and suppresses transmission (absorbs or reflects) of light having a wavelength of 670 nm or more.

<Effect Acquired by The Present Exemplary Embodiment>

As illustrated in FIG. 2, the dichroic mirror 109 does not completely transmit NIR light but a tiny amount of NIR light is reflected on the dichroic mirror 109. If the extra NIR light reflected on the dichroic mirror 109 is displayed on the screen via the second PBS prism 116, the blue liquid crystal panel 118, the red liquid crystal panel 120, and the projection optical system 122, the contrast will be reduced. However, in the present exemplary embodiment, reduction of contrast caused by the extra NIR light can be suppressed by arranging the NIR cut filter 901 at the above-described position. Further, even if the reflectance of the dichroic mirror 109 with respect to NIR light is not sufficiently low, the reduction of contrast caused by the extra NIR light can be suppressed.

Since the first color light and the NIR light enter the first PBS prism 111, naturally, an effect similar to the effect acquired by the above-described respective exemplary embodiment can be also acquired in the present exemplary embodiment. In other words, in the present exemplary embodiment, it is possible to realize a projection-type display apparatus capable of balancing quality of both images formed by visible light and NIR light through the configuration in which one prism is shared by two reflection-type light modulation elements.

<Variation Example>

While the preferred exemplary embodiments of the present disclosure have been described as the above, the present disclosure is not limited to the above exemplary embodiments, and various variations and modifications are possible within the scope of the present disclosure.

While in the above-described exemplary embodiments, an extra high-pressure mercury lamp has been used as the light source 101, the present disclosure is not limited thereto. A xenon lamp may be used as the light source 101. Alternatively, a light source unit in which a solid-state laser light source is combined with a fluorescent body such as a combination of a laser diode (LD) and a light-emitting diode (LED), may be used as the light source unit LSP. Further, a light source unit in which an LD or an LED that emits green light, an LD or an LED that emits red light, an LD or an LED that emits blue light, and an LD or an LED that emits NIR light are combined may be used as the light source unit LSP.

Further, while in the above-described first, the third, or the fourth exemplary embodiment, the first region 104 is configured to serve as a low-pass filter as an example, the present disclosure is not limited thereto. For example, the first region 104 may have its characteristic transmit both of visible light and NIR light. In this case, an image formed by the NIR light is mixed into the image formed by the visible light. However, if a night-vision goggle is not used, an influence of the image formed by the NIR light mixed into the image formed by visible light is small. Further, the filter unit 103 may have only the second region 105 without having the first region 104. In this case, the visible light mode and the NIR mode are switched over by inserting or removing the filter unit 103.

Further, in the above-described first, third, or fourth exemplary embodiment, the filter unit 103 is moved in parallel, so that the filter unit 103 can be inserted or removed to/from a path of light emitted from the light source unit LSP. More specifically, the filter unit 103 can be inserted or removed to/from a light path from the light source unit LSP to the color separation unit 109, of light paths from the light source unit LSP. However, the present disclosure is not limited thereto. For example, a filter unit having an optical characteristic similar to the filter unit 103 may be arranged at a position, which is excellent for installation, such as a position immediately after the projection optical system 122 in a light path from the light source unit LSP.

Further, a filter wheel may be employed. In the filter wheel, a region having a characteristic similar to the first region 104 is formed on a part of a rotatable circular board area and a region having a characteristic similar to the second region 105 is formed on another part of the circular board area. In this case, the visible light mode and the NIR mode can be switched over by rotating the filter wheel.

Alternatively, instead of the filter unit 103, a first filter unit having a characteristic similar to that of the first region 104 and a second filter unit having a characteristic similar to that of the second region 105 may be provided. In this configuration, the visible light mode and the NIR mode may be switched over by allowing a user to select one filter unit at a time to be inserted to the light path from the light source unit LSP, out of the first and the second filter units.

Further, while in the above-described exemplary embodiments, the integrator optical system 106 configured of the first fly-eye lens 106a and the second fly-eye lens 106b has been described as an example, the present disclosure is not limited thereto. For example, an integrator using a rod lens instead of a fly-eye lens may be used as the integrator optical system 106.

Further, while in the above-described exemplary embodiments, the condenser lens unit 108 having a single lens has been described as an example of the optical system, the present exemplary embodiment is not limited thereto. The condenser lens unit 108 may be an optical system having a plurality of lenses.

Furthermore, while in the above-described exemplary embodiments, green light and NIR light or red light and NIR light have been guided to the first PBS prism 111 through the dichroic mirror 109 as an example, the present disclosure is not limited thereto. A configuration may be employed in which the blue light and the NIR light may enter the first PBS prism 111, and the green light and the red light may enter the second PBS prism 116.

Further, while in the above-described exemplary embodiments, the color combining prism 121 is a dichroic prism as an example, which reflects the first color light and the NIR light and transmits the second color light and the third light. However, the present disclosure is not limited thereto. The color combining prism 121 may offer a polarization separation performance with respect to color light producing the higher relative visibility, of the second color light and the third color light, while transmitting another color light regardless of the polarization state, and reflect the first color light. In this case, a half-wavelength plate is arranged between the second PBS prism 116 and the color combining prism 121.

The above variation example based on the first exemplary embodiment will be described. The color combining prism 121 may offer the polarization separation performance with respect to red light and transmit blue light regardless of the polarization state while reflecting green light regardless of the polarization state. Then, in order to allow the red light reflected on the second PBS prism 116 to pass through the color combining prism 121, a half-wavelength plate may be arranged between the second PBS prism 116 and the color combining prism 121.

With this configuration, red light producing the relative visibility which is higher than blue light can be polarized and separated by both of the second PBS prism 116 and the color combining prism 121, and thus contrast of the visible light image can be improved further. Further, an amount of leaking blue light is reduced because blue light is converted to S-polarized light showing the high reflectance in a black display state.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2017-078473, filed Apr. 11, 2017, which is hereby incorporated by reference herein in its entirety.

What is claimed is:

1. A projection-type display apparatus, comprising:
   a light source unit capable of emitting first color light, second color light, third color light, and near infrared light;
   a first reflection-type light modulation element for modulating the first color light;
   a second reflection-type light modulation element for modulating the second color light;
   a third reflection-type light modulation element for modulating the third color light;
   a color combining unit configured to combine the first color light coming from the first reflection-type light modulation element, the second color light coming from the second reflection-type light modulation element, and the third color light coming from the third reflection-type light modulation element and guides combined light to a projection optical system;
   a color separation unit configured to guide the first color light coming from the light source unit in a direction different from a direction of the second color light and the third color light coming from the light source unit;
   a first polarization-separation unit configured to guide the first color light coming from the color separation unit to the first reflection-type light modulation element and guides the first color light coming from the first reflection-type light modulation element to the color combining unit; and
   a second polarization-separation unit configured to guide the second color light coming from the color separation unit to the second reflection-type light modulation element, guides the third color light to the third reflection-type light modulation element, and guides the second color light coming from the second reflection-type light modulation element and the third color light coming from the third reflection-type color modulation element to the color combining unit,
   where in the color separation unit is configured to guide the near infrared light coming from the light source unit to the first polarization separation unit,
   wherein the color combining unit is configured to guide the near infrared light coming from the first polarization-separation unit to the projection optical system, and
   wherein the first color light is green light, the second color light is red light, and the third color light is blue light.

2. The projection-type display apparatus according to claim 1, wherein the near infrared light coming from the color separation unit is modulated by the first reflection-type light modulation element.

3. The projection-type display apparatus according to claim 1, further comprising:
   a filter unit having a first region and a second region,
   wherein the first region is configured to transmit, the first color light, the second color light, and the third color light coming from the light source unit, and to suppress transmission of the near infrared light coming from the light source unit, and
   wherein the second region is configured to suppress transmission of the first color light, the second color light, and the third color light coming from the light source unit, and to transmit the near infrared light coming from the light source unit.

4. The projection-type display apparatus according to claim 3, wherein the filter unit is configured to be inserted into or removed from a path of light emitted from the light source unit.

5. The projection-type display apparatus according to claim 4, wherein the projection-type display apparatus is configured to be switched between a first mode in which the first region of the filter unit is inserted into the light path and a second mode in which the second region of the filter unit is inserted to the light path.

6. The projection-type display apparatus according to claim 1, further comprising:
   a fourth reflection-type light modulation element for modulating the near infrared light,
      wherein the first polarization separation unit is capable of guiding the near infrared light coming from the color separation unit to the fourth reflection-type light modulation element and guiding the near infrared light coming from the fourth reflection-type light modulation element to the color combining unit.

7. The projection-type display apparatus according to claim 6, further comprising:
   a wavelength-selective phase plate which converts a polarization state of one of the first color light and the near infrared light coming from the color separation unit and maintains a polarization state of another one of the first color light and the near infrared light.

8. The projection-type display apparatus according to claim 1, further comprising:
   a color separation element arranged between the color separation unit and the second polarization separation unit,
   wherein the color separation element guides the second color light and the third color light coming from the color separation unit to the second polarization separation unit and suppresses transmission of the near infrared light coming from the color separation unit.

9. The projection-type display apparatus according to claim 1, further comprising:
   a holding unit configured to hold, the projection optical system.

10. The projection-type display apparatus according to claim 9, wherein the holding unit is configured to detachably hold the projection optical system.

* * * * *